(12) United States Patent
Mercier et al.

(10) Patent No.: US 10,968,797 B2
(45) Date of Patent: Apr. 6, 2021

(54) VALVE WITH A BALL BEARING AND EXHAUST LINE COMPRISING SAID VALVE

(71) Applicant: FAURECIA SYSTEMES D'ECHAPPEMENT, Nanterre (FR)

(72) Inventors: Alain Mercier, Nommay (FR); Ronan Botella, Chevremont (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/451,738

(22) Filed: Jun. 25, 2019

(65) Prior Publication Data

US 2019/0390581 A1 Dec. 26, 2019

(51) Int. Cl.
| | |
|---|---|
| *F01N 1/16* | (2006.01) |
| *F16C 35/06* | (2006.01) |
| *F16C 41/02* | (2006.01) |
| *F16K 1/22* | (2006.01) |
| *F16L 55/027* | (2006.01) |

(52) U.S. Cl.
CPC .............. *F01N 1/163* (2013.01); *F16C 35/06* (2013.01); *F16C 41/02* (2013.01); *F16K 1/224* (2013.01); *F16L 55/027* (2013.01)

(58) Field of Classification Search
CPC ............ F01N 1/163; F02D 9/04; F02D 9/106; F02M 26/70; F16C 19/50; F16C 23/08; F16C 35/06; F16C 41/02; F16K 1/224; F16L 55/027
See application file for complete search history.

(56) References Cited

U.S. PATENT DOCUMENTS

| | | | |
|---|---|---|---|
| 53,186 A | 3/1866 | Robinson | |
| 3,811,651 A * | 5/1974 | Gallagher | ............... F16K 1/221 251/335.3 |
| 7,574,797 B2 | 8/2009 | Rauch et al. | |
| 2015/0267634 A1* | 9/2015 | Mashiki | .............. F02D 41/0057 123/295 |

FOREIGN PATENT DOCUMENTS

| | | |
|---|---|---|
| BE | 345038 A | 5/1854 |
| DE | 1775618 A1 | 1/1972 |
| DE | 102011079742 A1 | 1/2013 |
| GB | 1433918 A | 4/1976 |

OTHER PUBLICATIONS

French Search Report for French Application No. 1855706 dated Mar. 8, 2019.

* cited by examiner

*Primary Examiner* — Audrey K Bradley
*Assistant Examiner* — Dapinder Singh
(74) *Attorney, Agent, or Firm* — Carlson, Gaskey & Olds, P.C.

(57) ABSTRACT

The valve includes a valve body that inwardly defines a passage for circulation of a fluid, a drive shaft, and a bearing to guide the rotation of the drive shaft. The bearing comprises a chamber surrounding a segment of the drive shaft and a plurality of balls filling the chamber. The balls are free inside the chamber, and the chamber is completely filled with balls. The balls are in contact with the drive shaft along all or part of the segment.

11 Claims, 3 Drawing Sheets

VALVE WITH A BALL BEARING AND EXHAUST LINE COMPRISING SAID VALVE

CROSS-REFERENCE TO RELATED APPLICATIONS

This application is a U.S. non-provisional application claiming the benefit of French Application No. 18 55706, filed on Jun. 26, 2018, which is incorporated herein by its entirety.

FIELD OF INVENTION

The invention generally relates to valves, in particular valves for exhaust lines.

BACKGROUND

Some exhaust lines include valves, arranged along pipes in which the exhaust gases circulate. Such valves, for example, make it possible to modulate the quantity of exhaust gases recycled toward the section of the combustion chambers, to deviate part of the exhaust gases toward a heat recovery exchanger, or to completely or partially close off a part or subpart of the exhaust line for acoustic or backpressure regulating purposes, in the case of deactivation of cylinders of the engine.

The flow of exhaust gases is pulsed, when the engine is a thermal combustion engine. The pulsation of the gases depends on a large number of factors. It depends on the number of cylinders of the engine. The arrangement of the manifold capturing the exhaust gases leaving the combustion chambers of the engine affects the mixing of the gases coming from each cylinder, and thus determines the signature of the pulsation of the gases. Furthermore, the filtering volumes such as the catalysts or the particle filters attenuate the pulsation of the gases. Lastly, the speed and the charge of the engine respectively determine the frequency and the amplitude of the pulsation of the gases.

Valves of the butterfly type are particularly sensitive to the pulsation of the gases. Indeed, these valves typically have a flap fastened to a rotary shaft guided by one or several bearings. So as to allow an easy assembly of the shaft in the bearing(s) and to reduce the friction coefficient, an interstice is generally provided between the outer diameter of the shaft and the inner diameter of the bearing.

The flap is placed in the exhaust gas flow. The flap and the shaft are thus exposed to a pulsed variable force, the frequency of which is proportional to the pulsation frequency of the gases. This force generates a to-and-fro movement of the shaft inside the bearing, transversely, which in some cases creates a chattering noise. This chattering noise can be heard by the user of the vehicle and deteriorates the quality perceived by the user. This is not acceptable, in particular in the premium vehicles segment.

In this context, a valve is proposed that does not have the above flaw.

SUMMARY OF THE INVENTION

A valve includes a valve body inwardly defining a passage for circulation of a fluid, a flap housed in the valve body, and a drive shaft that rotates the flap relative to the valve body. The flap is fastened to the drive shaft. A guide bearing guides the rotation of the drive shaft. The bearing comprises a chamber surrounding a segment of the drive shaft, and a plurality of balls filling the chamber, the balls being free inside the chamber, the chamber being completely filled with balls and the balls being in contact with the drive shaft along all or part of the segment.

Thus, because the chamber is completely filled with balls, and the balls are in contact with the drive shaft along the entire segment, the transverse oscillations of the drive shaft are prevented by the balls. The balls block the movement of the segment of the drive shaft relative to the guide bearing. As a result, the chattering noise is eliminated.

Conversely, the balls do not prevent the rotation of the drive shaft around itself. They behave like a viscous liquid or finely divided sand.

The advantage relative to a viscous liquid is that the balls are large enough not to escape from the chamber along the shaft, such that it is not necessary to provide a costly sealing device.

The valve may also have one or more of the following characteristics, considered individually or in all technically possible combinations:
  the chamber is delimited by a peripheral wall surrounding the segment of the drive shaft, the peripheral wall being radially separated from the segment of the drive shaft by a radial space having a minimum, the balls having a diameter smaller than or equal to said minimum, preferably smaller than 50% of said minimum, more preferably smaller than 25% of said minimum;
  wherein the chamber is longitudinally delimited on a first side by a first wall, longitudinally on a second side opposite the first by a second wall, the chamber holding a quantity of balls chosen such that the balls are in constant contact simultaneously with the first wall, the second wall and the drive shaft;
  the guide bearing comprises a bearing body inwardly delimiting a cavity, the first wall being a stationary wall defined by the bearing body, the second wall being a wall movable along the drive shaft and placed in the cavity;
  the guide bearing comprises a resilient member stressing the first and second walls longitudinally toward one another;
  the stationary wall delimits the chamber toward the valve body, the resilient member being inserted between the moving wall and another stationary wall defined by the bearing body and delimiting the bearing body opposite the valve body;
  the drive shaft traverses the first wall and/or the second wall respectively through a first orifice and/or a second orifice that are arranged in said walls;
  the drive shaft is separated from respective edges of the first and/or second orifices by interstitial spaces with a width smaller than the size of the balls.

According to a second aspect, the invention relates to an exhaust line comprising a valve having the above features, wherein the fluid circulating in the valve body is made up of exhaust gases.

According to a third aspect, the invention relates to a vehicle comprising a heat engine and an exhaust line according to the above features, fluidly connected to exhaust gas outlets of the heat engine.

BRIEF DESCRIPTION OF THE DRAWINGS

Other characteristics and advantages of the invention will emerge from the detailed description given below, by way of indication and without limitation, with reference to the annexed figures, including.

DETAILED DESCRIPTION

Figure 1:
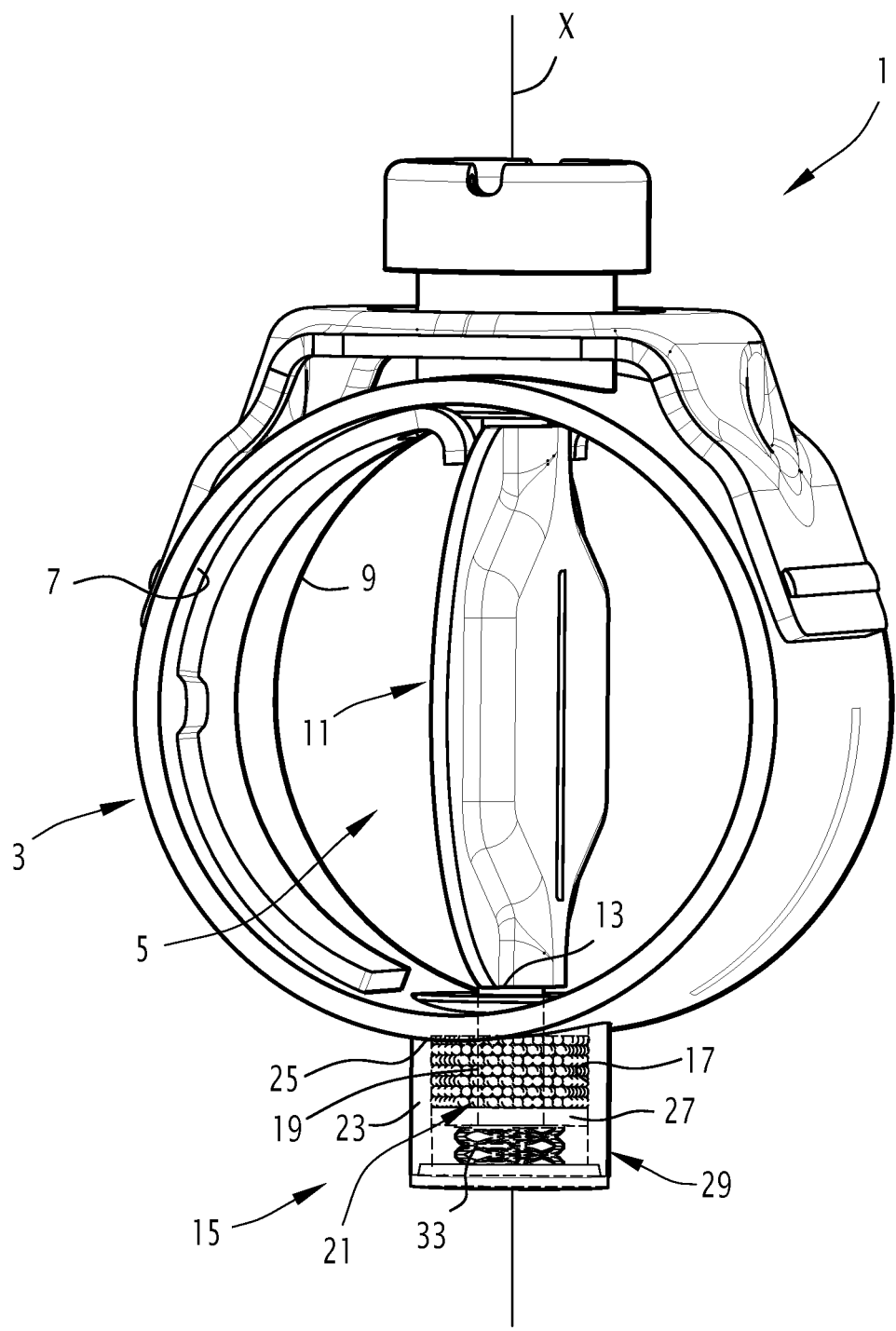
FIG. 1 is a perspective view of a valve according to the invention.
Figure 3:
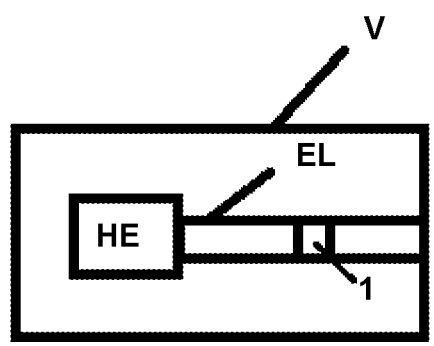
FIG. 3 is a schematic view of a valve inserted in an exhaust line of a vehicle.

The valve 1 shown in FIG. 1 is typically designed to be inserted in a vehicle exhaust line EL as shown in FIG. 3. This vehicle is, for example, a motor vehicle V equipped with a heat engine HE.

In a variant, the valve is inserted in another circuit of the vehicle, in which another fluid circulates.

In still another variant, the valve is placed in a circuit that is not part of a vehicle.

In any case, as explained above, the valve is advantageously used in a circuit traveled by a fluid with pulsed circulation.

As shown in FIG. 1, the valve 1 includes a valve body 3, inwardly defining a passage 5 for the circulation of a fluid.

The valve 1 must withstand temperatures above 500° C. This is the case in particular when the fluid circulating in the circulation passage 5 is the exhaust gases of the vehicle.

The valve body 3 has at least a fluid inlet 7 and a fluid outlet 9, the passage 5 fluidly connecting the inlet 7 to the fluid outlet 9.

In the example shown, the valve body 3 is cylindrical. In a variant, it has any other shape.

The valve 1 also includes a flap 11, housed in the valve body 3, and a shaft 13 for rotating the flap 11 relative to the valve body 3. The flap 11 is rotatable around the axis X, shown in the figures.

Typically, the flap 11 is movable relative to the valve body 3 between a closing position in which the flap 11 closes off the fluid circulation passage 5 and prohibits the circulation of the fluid from the inlet 7 to the outlet 9, and at least one free position of the circulation passage 5, thus allowing the circulation of the fluid from the inlet 7 to the outlet 9.

The valve 1 can be of the adjusting type. In this case, the flap 11 is able to be placed in a plurality of free positions of the fluid circulation passage 5, corresponding to different passage sections offered to the fluid circulating along the circulation passage 5.

The flap 11 is fixed to the drive shaft 13.

In the illustrated example, the valve 1 is of the butterfly type, the drive shaft 13 extending along a median line of the flap 11.

In a variant, the valve 1 is not of the butterfly type. The drive shaft 13 is for example fastened along an edge of the flap 11.

The flap 11 has all types of shape. In the illustrated example, it has a circular general shape. In a variant, it is rectangular.

The valve 1 advantageously includes a bearing 15 for guiding the rotation of the drive shaft 13, comprising a chamber 17 surrounding a segment 19 of the drive shaft 13, and a plurality of balls 21 filling the chamber 17.

The segment 19 of the drive shaft 13 is typically an end segment of the drive shaft 13. In a variant, the segment 19 is not an end segment of the drive shaft 13, the drive shaft 13 passing all the way through the chamber 17.

Advantageously, the valve 1 includes another bearing, not shown, guiding the rotation of the other end of the drive shaft 13. This other end is typically connected to an actuator, configured to drive the rotation of the drive shaft 13.

Figure 2:
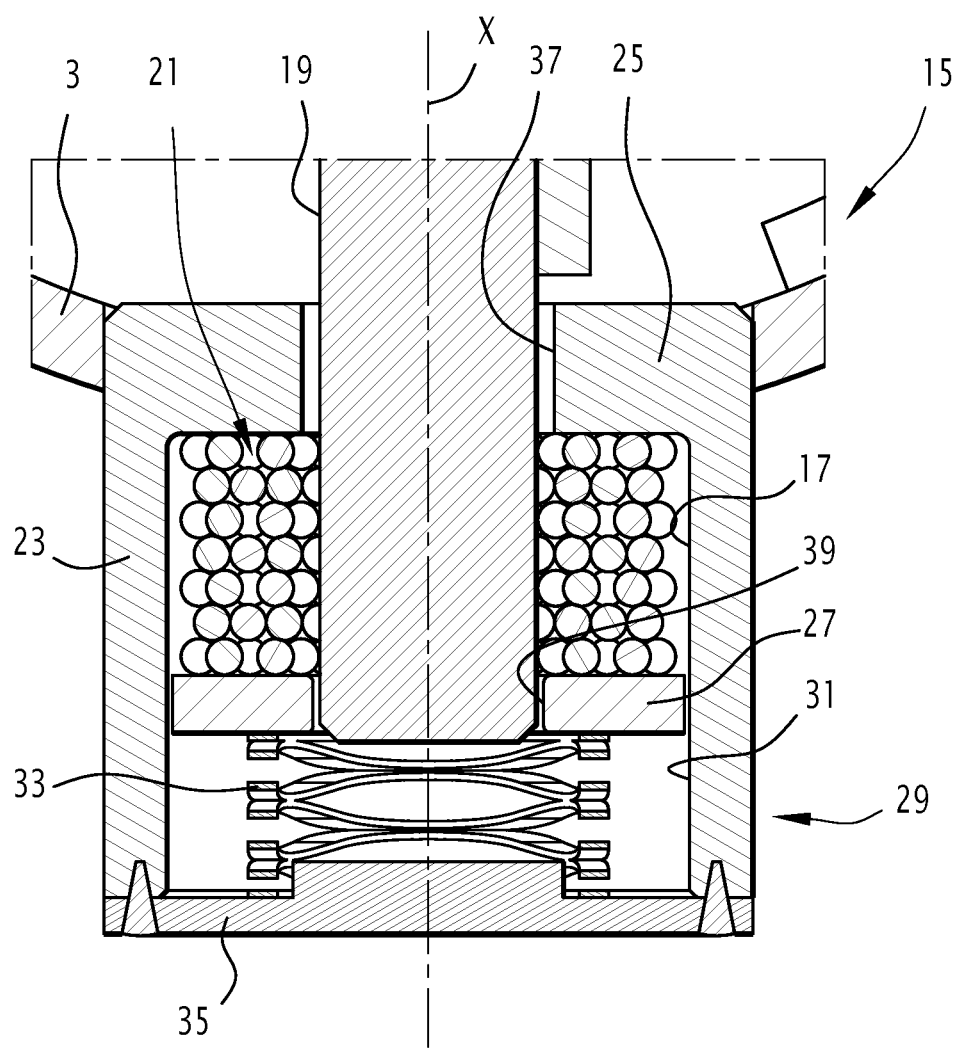
FIG. 2 is a perspective and partial sectional view of a lower bearing of the valve.

As shown more clearly in FIG. 2, the guide bearing 15 includes a large number of balls 21.

The balls 21 are free inside the chamber 17. This means that they are not rigidly fastened to the walls of the chamber 17 or connected to one another.

The chamber 17 is completely filled with balls 21. This means that the entire volume of the chamber 17 is occupied by balls 21, only small interstices remaining between the balls 21, said interstices resulting from the spherical shape of the balls 21. It is impossible or practically impossible to add balls 21 in the chamber 17.

The balls 21 are in contact with the drive shaft 13 along the entire segment 19.

Thus, because the balls 21 are in contact with the drive shaft 13 along the entire segment 19 and because the chamber 17 is completely filled with balls, it is not possible for an oscillating movement of the drive shaft 13 to be able to push the balls 21 transversely on one side or the other.

The balls 21 are made from a material chosen to prevent long-term corrosion. Corrosion could in fact have a negative impact on the properties of the balls 21. It could in particular prevent the rotation of the drive shaft 13 around its axis.

Preferably, the balls 21 are made from stainless steel or from a flexible material such as an elastomer. The stainless steel is, for example, a martensitic steel, preferably of type 440, or an austenitic steel, preferably of type 316. In a variant, the balls 21 are made from ceramic, silica.

As shown in FIG. 2, the chamber 17 is delimited inter alia by a peripheral wall 23, surrounding the segment 19 of the drive shaft 13. The peripheral wall 23 completely surrounds the segment 19 of the drive shaft 13. The peripheral wall 23 is radially separated from the segment 19 of the drive shaft 13 by a radial separation having a minimum.

In the illustrated example, the peripheral wall 23 is cylindrical. It has, perpendicular to the rotation axis X, a circular section. The radial separation between the segment 19 of the drive shaft 13 and the peripheral wall 23 is therefore constant.

In a variant, the peripheral wall 23 has, perpendicular to the rotation axis X, a rectangular section or any other section. The radial separation is then variable, and has a minimum and a maximum.

Typically, the balls 21 are spherical, with a diameter smaller than or equal to said minimum, preferably smaller than 50% of said minimum, more preferably smaller than 25% of said minimum.

Thus, at least two balls are provided, radially, between the segment 19 of the drive shaft 13 and the peripheral wall 23.

Preferably, the diameter of the balls 21 is between 0.2 mm and 3 mm, typically between 0.5 and 2.5 mm.

Typically, the balls all have substantially the same diameter. In a variant, the balls have different diameters from one another, some balls for example having a diameter of 1 mm and other balls for example a diameter of 2 mm.

For an application to a typical exhaust line valve, the chamber 17 includes about a thousand balls with a diameter of 1 mm. In a variant, the chamber 17 includes about ten thousand balls with a diameter of 0.5 mm.

The chamber 17 is longitudinally delimited on a first side by a first wall 25 and longitudinally on a second side opposite the first by a second wall 27.

The chamber 17 contains a quantity of balls 21 chosen such that the balls 21 are in constant contact simultaneously with the first wall 25, the second wall 27 and the drive shaft 13.

The balls 21 are also in contact with the peripheral wall 23.

Advantageously, the guide bearing 15 comprises a bearing body 29 inwardly delimiting a cavity 31.

In the illustrated example, the bearing body 29 is located outside the valve body 3 and is rigidly fastened to the valve body 3.

The first wall 25 is a stationary wall defined by the bearing body 29.

For example, the first wall 25 is pressed against the valve body 3, or is even made up of the valve body 3.

The second wall 27 is a wall movable along the drive shaft 13, and placed in the cavity 31.

The guide bearing 15 also comprises a resilient member 33 stressing the first and second walls 25, 27 longitudinally toward one another. Thus, because the movable wall 27 is continuously stressed toward the stationary wall 25, the chamber 17 is always completely filled by the balls 21. No free space can exist that is not filled by the balls 21. In the case where such a free space exists, the pressure exerted by the resilient member 33 on the movable wall 27 would force the balls 21 to reorganize themselves inside the chamber 17 in order to fill in the empty space.

This would cause a slight movement of the movable wall 27 toward the stationary wall 25.

Advantageously, the stationary wall 25 delimits the chamber 17 toward the valve body 3. The resilient member 33 is inserted between the movable wall 27 and another stationary wall 35 defined by the bearing body 29 and delimiting the bearing body 29 opposite the valve body 3.

In other words, the cavity 31 is divided into two parts by the movable wall 27, one of the two parts making up the chamber 17 for receiving the balls 21, and the other part making it possible to house the resilient member 33.

The movable wall 27 can move longitudinally inside the cavity 31. It has, perpendicular to the rotation axis X, an outer section conjugated to the inner section of the cavity 31. It is therefore guided in translation by the inner surface of the cavity 31.

The resilient member 33 is of any suitable type. The resilient member 33 is, for example, a helical spring. In a variant, the resilient member 33 is a stack of Belleville washers or a spring with undulated strips as illustrated in the figures.

The resilient member 33 is bearing on one side directly on the other stationary wall 35, and on the other side directly on the movable wall 27.

The drive shaft 13 passes through the first wall 25 through a first orifice 37. It passes through the second, movable wall 27 through a second orifice 39.

The drive shaft 13 is separated from respective edges of the first and/or second orifices 37, 39 by interstitial spaces with a width smaller than the size of the balls 21. Thus, the balls 21 cannot escape along the drive shaft 13 through the interstices.

Likewise, the movable wall 27 is separated from the inner surface of the bearing body 29 by an interstice with a width smaller than the size of the balls 21. The balls 21 therefore also cannot escape from the chamber 17 through said interstice between the movable wall 27 and the bearing body 29.

The bearing body 29 also defines the peripheral wall 23.

In the illustrated example, the end of the drive shaft 13 is located longitudinally substantially in the second orifice 39.

In a variant, the end of the drive shaft 13 extends past the movable wall 27, and is therefore located in the part of the cavity 31 that is not filled with the balls 21.

According to another variant, the movable wall 27 is solid and does not include a second orifice 39. The end of the drive shaft 13 is located in the chamber 17.

According to still another variant, the chamber 17 containing the balls 21 is delimited between the other stationary wall 35 and the movable wall 27. The resilient means 33 is then inserted between the stationary wall 25 and the movable wall 27.

In a variant, the bearing body 29 is located inside the valve body 3.

According to still another variant, the drive shaft 13 passes all the way through the bearing body 29, the end of the drive shaft 13 leaving the bearing body 29 while being connected to an actuator.

The valve 1 may include only one bearing 15 of the type described above. In a variant, the valve 1 includes two bearings 15 of the type described above with balls 21, guiding the drive shaft 13 at its two opposite ends.

According to still another variant, the first and second walls 25, 27, longitudinally delimiting the chamber 17, are both stationary.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve, comprising:
   a valve body, inwardly defining a passage for circulation of a fluid;
   a flap housed in the valve body;
   a drive shaft to rotate the flap relative to the valve body, the flap being fastened to the drive shaft;
   a guide bearing to guide the rotation of the drive shaft, the guide bearing comprising a chamber surrounding a segment of the drive shaft, and a plurality of balls filling the chamber, the plurality of balls being free inside the chamber, the chamber being completely filled with the plurality of balls and the plurality of balls being in contact with one another and being in contact with the drive shaft along all or part of the segment.

2. The valve according to claim 1, wherein the chamber is delimited by a peripheral wall surrounding the segment of the drive shaft, the peripheral wall being radially separated from the segment of the drive shaft by a radial space having a minimum, the plurality of the balls having a diameter smaller than or equal to said minimum.

3. The valve according to the claim 1, wherein the chamber is longitudinally delimited on a first side by a first wall, longitudinally on a second side opposite the first side by a second wall, the chamber having a quantity of the plurality of the balls that is chosen such that the plurality of the balls are in constant contact simultaneously with the first wall, the second wall, and the drive shaft.

4. The valve according to claim 3, wherein the guide bearing comprises a bearing body inwardly delimiting a cavity, the first wall being a stationary wall defined by the bearing body, the second wall being a wall movable along the drive shaft and placed in the cavity.

5. The valve according to claim 3, wherein the guide bearing comprises a resilient member stressing the first and second walls longitudinally toward one another.

6. The valve according to claim 5, wherein the guide bearing comprises a bearing body inwardly delimiting a cavity, the first wall being a stationary wall defined by the bearing body, the second wall being a wall movable along the drive shaft and placed in the cavity, the stationary wall delimiting the chamber toward the valve body, the resilient member being inserted between the moving wall and another stationary wall defined by the bearing body and delimiting the bearing body opposite the valve body.

7. The valve according to claim 3, wherein the drive shaft traverses the first wall and/or the second wall respectively through a first orifice and/or a second orifice that are arranged in the first and/or second walls.

8. The valve according to claim 7, wherein the drive shaft is separated from respective edges of the first and/or second orifices by interstitial spaces with a width smaller than a size of the plurality of balls.

9. The valve according to the claim 1, wherein the plurality of balls are in contact with the drive shaft along the entire part of the segment which is engaged in the chamber.

10. An exhaust line comprising a valve according to claim 1, wherein the fluid circulating in the valve body is made up of exhaust gases.

11. A vehicle comprising a heat engine and an exhaust line according to claim 10, fluidly connected to exhaust gas outlets of the heat engine.

\* \* \* \* \*